US010322647B2

(12) United States Patent
Naito

(10) Patent No.: US 10,322,647 B2
(45) Date of Patent: Jun. 18, 2019

(54) FUEL CELL-EQUIPPED VEHICLE

(71) Applicant: HONDA MOTOR CO., LTD., Minato-ku, Tokyo (JP)

(72) Inventor: Hideharu Naito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/915,187

(22) Filed: Mar. 8, 2018

(65) Prior Publication Data
US 2018/0257508 A1 Sep. 13, 2018

(30) Foreign Application Priority Data

Mar. 13, 2017 (JP) .................................. 2017-047593

(51) Int. Cl.
*B60L 11/18* (2006.01)
*H01M 8/04089* (2016.01)
(Continued)

(52) U.S. Cl.
CPC ...... *B60L 11/1883* (2013.01); *B60H 1/00392* (2013.01); *B60H 1/28* (2013.01); *B60K 1/00* (2013.01); *B60K 1/04* (2013.01); *B60L 50/71* (2019.02); *B60L 50/72* (2019.02); *H01M 8/04089* (2013.01); *B60K 2001/005* (2013.01); *B60K 2001/0411* (2013.01); *H01M 2250/20* (2013.01); *Y02T 10/7005* (2013.01); *Y02T 90/16* (2013.01); *Y02T 90/32* (2013.01)

(58) Field of Classification Search
CPC ............. B60L 11/1883; B60L 11/1896; B60H 1/00392; B60H 1/28; B60K 2001/0411
See application file for complete search history.

(56) References Cited

U.S. PATENT DOCUMENTS 5,280,852 A * 1/1994 Dauvergne ......... B60H 1/00357
237/12.3 A
9,701,192 B2 * 7/2017 Nakagawa ............. B60K 13/04
(Continued)

FOREIGN PATENT DOCUMENTS

JP 2002-367648 12/2002
JP 2004-040950 2/2004
(Continued)

OTHER PUBLICATIONS

Japanese Office Action for Japanese Patent Application No. 2017-047593 dated Oct. 9, 2018.

*Primary Examiner* — Brian L Swenson
(74) *Attorney, Agent, or Firm* — Amin, Turocy & Watson LLP

(57) ABSTRACT

A fuel cell-equipped vehicle includes a fuel cell stack disposed in a front space of a vehicle body by a partition member, and an air conditioner disposed in a rear space of the vehicle body separated by the partition member, wherein external air is introduced into the air conditioner through an external air intake port formed at a portion of the partition member located on a first side with respect to a center in a vehicle width direction of the vehicle body, downstream end of the exhaust duct configured to discharge a reaction gas in the casing communicates with an outside of the vehicle body at a portion located on a second side with respect to the center in the vehicle width direction.

10 Claims, 3 Drawing Sheets

(51) Int. Cl.
*B60K 1/04* (2019.01)
*B60H 1/00* (2006.01)
*B60H 1/28* (2006.01)
*B60K 1/00* (2006.01)
*B60L 50/72* (2019.01)
*B60L 50/71* (2019.01)

(56) References Cited

U.S. PATENT DOCUMENTS

| | | | |
|---|---|---|---|
| 9,905,878 B2* | 2/2018 | Nishiyama | H01M 8/2475 |
| 2004/0026427 A1* | 2/2004 | Shigematsu | B60K 15/03006 |
| | | | 220/562 |
| 2007/0298705 A1* | 12/2007 | Yoshida | B60H 1/00392 |
| | | | 454/254 |
| 2011/0059341 A1* | 3/2011 | Matsumoto | B60H 1/00278 |
| | | | 429/82 |
| 2012/0049664 A1* | 3/2012 | Yokoyama | B60H 1/00392 |
| | | | 310/53 |
| 2015/0270562 A1* | 9/2015 | Naito | H01M 8/04201 |
| | | | 429/458 |
| 2016/0236536 A1* | 8/2016 | Hirakata | B60L 3/0053 |
| 2017/0326949 A1* | 11/2017 | Omi | B60H 1/00 |

FOREIGN PATENT DOCUMENTS

| | | |
|---|---|---|
| JP | 2004-042759 | 2/2004 |
| JP | 2010-179866 | 8/2010 |
| JP | 2013-191515 | 9/2013 |

* cited by examiner

FUEL CELL-EQUIPPED VEHICLE

CROSS-REFERENCE TO RELATED APPLICATION

Priority is claimed on Japanese Patent Application No. 2017-047593, filed Mar. 13, 2017, the content of which is incorporated herein by reference.

BACKGROUND OF THE INVENTION

Field of the Invention

The present invention relates to a fuel cell-equipped vehicle.

Description of Related Art

In a fuel cell-equipped vehicle, a driving motor and a fuel cell stack are accommodated in a motor compartment (front space) located in a front portion of a vehicle body.

The motor compartment is partitioned by a partition member (for example, a dashboard, a cowl member, and so on). The fuel cell stack has a stacked cell body formed by stacking a plurality of unit cells and a casing which accommodates the stacked cell body.

The fuel cell-equipped vehicle travels by driving the driving motor with electric energy generated in the fuel cell stack.

However, in the above-described fuel cell stack, a reaction gas (fuel gas or oxidant gas) flowing in the stacked cell body may leak into the motor compartment through a gap between the unit cells.

Therefore, for example, Japanese Unexamined Patent Application, First Publication No. 2004-40950 discloses a constitution in which a ventilation opening is formed at an uppermost portion of a hood closing the motor compartment. The reaction gas leaking into the motor compartment (outside of the casing) is discharged to the outside of the vehicle through the ventilation opening.

SUMMARY OF THE INVENTION

However, for example, an external air intake port for introducing external air into an air conditioner may be formed in the partition member. In this case, the reaction gas staying in the motor compartment may pass through the external air intake port and then may be introduced into the air conditioner together with the external air. The reaction gas introduced into the air conditioner may pass through the air conditioner and then may be supplied into a passenger compartment.

Accordingly, an aspect of the present invention has been made in view of the above-described circumstances, and an object thereof is to provide a fuel cell-equipped vehicle which is capable of effectively discharging a reaction gas leaking from a stacked cell body outside of a vehicle.

(1) To achieve the above-described object, a fuel cell-equipped vehicle according to an aspect of the present invention includes a fuel cell stack disposed in a front space of a vehicle body separated by a partition member and configured to accommodate a stacked cell body, in which a plurality of fuel cells are stacked, in a casing, and an air conditioner disposed in a rear space of the vehicle body separated by the partition member, wherein external air is introduced into the air conditioner through an external air intake port formed at a portion of the partition member located on a first side with respect to a center in a vehicle width direction of the vehicle body, an upstream end of an exhaust duct configured to discharge a reaction gas in the casing is connected to a communication port formed in the casing to allow communication between an inside and outside of the fuel cell stack, and a downstream end of the exhaust duct communicates with an outside of the vehicle body at a portion located on a second side with respect to the center in the vehicle width direction.

(2) In the aspect of (1), the fuel cell-equipped vehicle may further include a hood configured to close the front space from an upper side thereof and to extend upward as it goes rearward, and the exhaust duct may have a manifold configured to extend upward as it goes rearward along the hood, and a connecting portion connected to an uppermost portion of the manifold and configured to extend to the second side in the vehicle width direction.

According to the aspect of (1), a reaction gas leaking from the stacked cell body passes within the communication port through the exhaust duct and is discharged outside of the vehicle. Meanwhile, external air introduced into the air conditioner through the external air intake port exchanges heat in the air conditioner and is then supplied into a passenger compartment.

Here, in the aspect of (1), the downstream end of the exhaust duct and the external air intake port to the air conditioner are disposed on both sides with respect to the center in the vehicle width direction. Therefore, a discharge position of the reaction gas and the external air intake port can be separated in the vehicle width direction, and the reaction gas discharged through the exhaust duct can be prevented from flowing into the external air intake port. Therefore, it is possible to prevent the reaction gas leaking from the fuel cell stack from being supplied to the passenger compartment together with external air through the air conditioner.

According to the aspect of (2), the reaction gas (in particular, the fuel gas) flowing into the manifold is guided upward as it goes rearward. The reaction gas guided upward in the manifold flows into the connecting portion connected to the uppermost portion of the manifold and is then discharged to the outside of the vehicle. Therefore, the reaction gas flowing through the exhaust duct can be efficiently discharged to the outside of the vehicle.

DETAILED DESCRIPTION OF THE INVENTION

Hereinafter, embodiments of the present invention will be described below with reference to the drawings.

[Fuel Cell-Equipped Vehicle]

Figure 1:
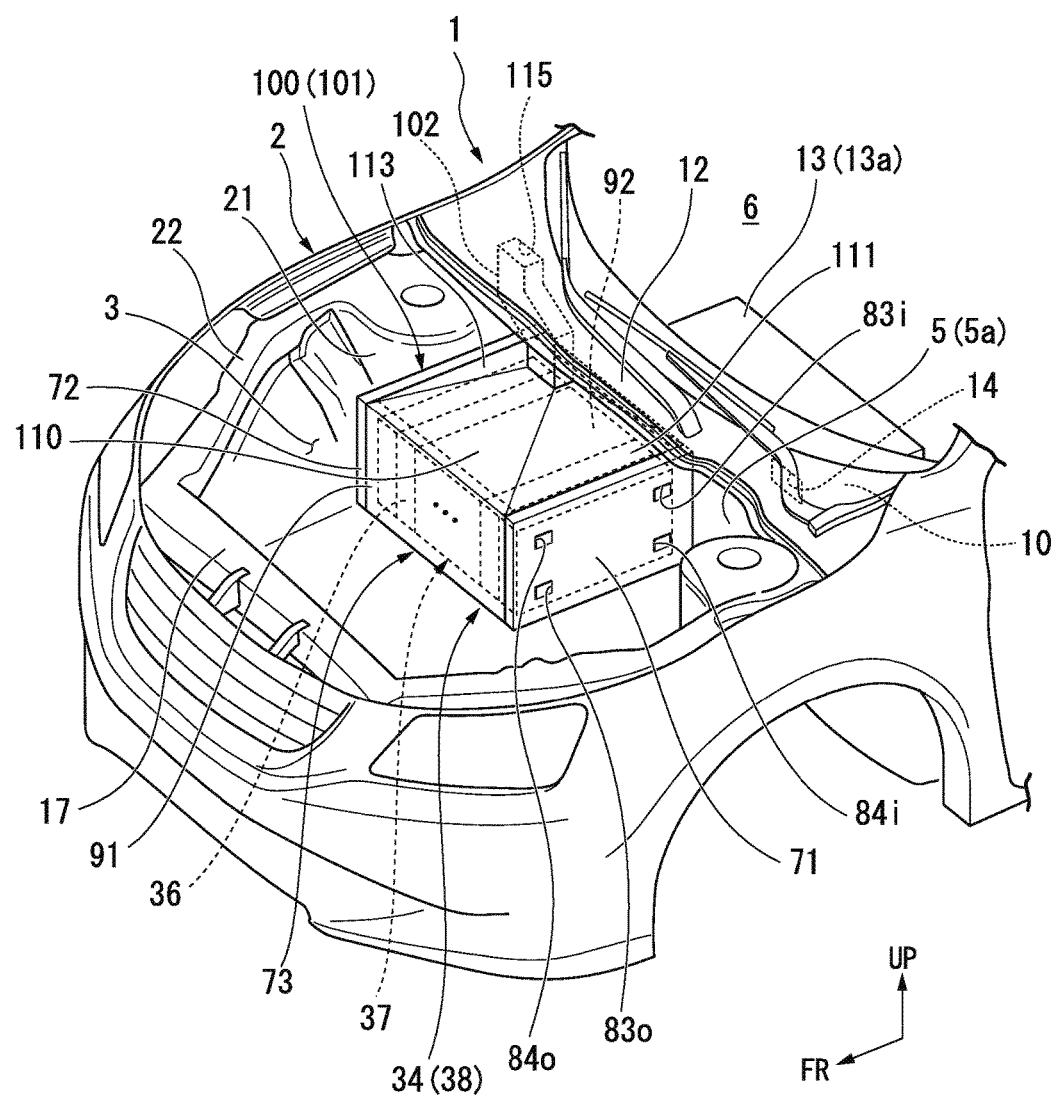
FIG. 1 is a schematic perspective view showing a front portion of a fuel cell-equipped vehicle on which a fuel cell stack according to an embodiment is mounted.
Figure 2:
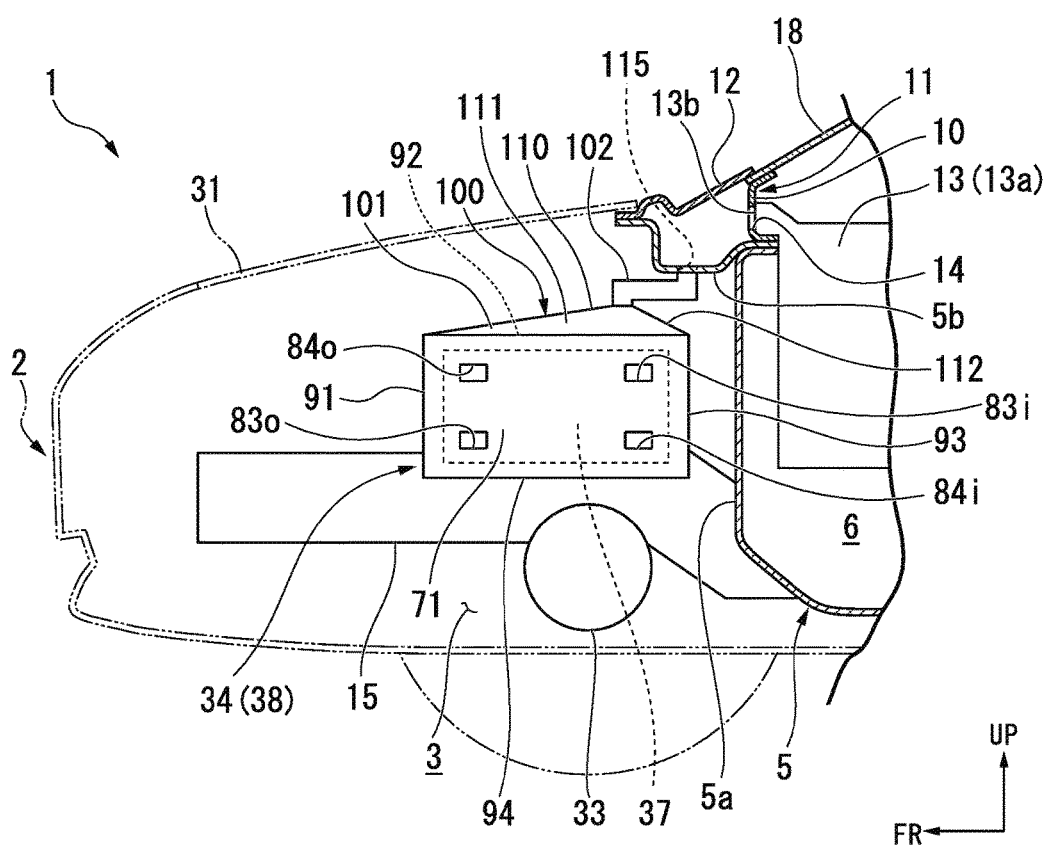
FIG. 2 is a schematic cross-sectional view showing the front portion of the fuel cell-equipped vehicle on which the fuel cell stack according to the embodiment is mounted.

FIG. 1 is a schematic perspective view showing a front portion of a fuel cell-equipped vehicle 1 (hereinafter, simply referred to as vehicle 1) on which a fuel cell stack 34 according to a embodiment is mounted. FIG. 2 is a schematic cross-sectional view showing the front portion of the vehicle 1. In the following description, directions such as frontward and rearward, upward and downward, rightward and leftward, and so on are the same as those in the vehicle 1 unless otherwise noted. In this case, an arrow UP in the drawing indicates an upward direction, and an arrow FR indicates a forward direction.

In the vehicle 1 shown in FIGS. 1 and 2, a motor compartment (front space) 3 is partitioned and defined at a front portion of a vehicle body 2. The motor compartment 3 is located in front of a passenger compartment 6 with a dashboard 5 interposed therebetween.

The dashboard 5 extends over the entire vehicle body 2 in a leftward and rightward direction. As shown in FIG. 2, the dashboard 5 includes a dashboard lower 5a extending in a vertical direction, and a dashboard upper 5b protruding forward from an upper end of the dashboard lower 5a. A lower end of the dashboard lower 5a is connected to a floor panel (not shown).

A windshield 10 extends upward from an upper end of the dashboard lower 5a. A front glass 18 which extends upward to be inclined rearward is installed at an upper end of the windshield 10.

The dashboard upper 5b and the windshield 10 form a cowl member 11 having a U-shaped cross section which opens upward. An upper end opening portion of the cowl member 11 is covered with a cowl top 12. The dashboard 5, the windshield 10 and the cowl top 12 described above form a partition member of the embodiment. Further, another member for partitioning the motor compartment 3 and the passenger compartment 6 may be provided as the partition member.

In the passenger compartment 6, an instrument panel (not shown) is provided behind the dashboard 5. In the passenger compartment 6, an air conditioner 13 is accommodated in a space (rear space) between the dashboard 5 and the instrument panel (not shown). The air conditioner 13 is constituted by accommodating a blower, an evaporator, a heater core, and so on in a casing 13a.

An external air intake port 14 is formed on a left end (first side) of the above-described cowl member 11 (windshield 10) in the leftward and rightward direction. The external air intake port 14 passes through the windshield 10 in a forward and rearward direction. The external air intake port 14 communicates with an outside of the vehicle 1 through, for example, a communication hole (not shown) formed in the cowl top 12. The external air intake port 14 communicates with an inside of the air conditioner 13 through an external air introduction hole 13b of the air conditioner 13. That is, the external air in the cowl member 11 passes through the external air intake port 14 and is then introduced into the air conditioner 13 through the external air introduction hole 13b.

A pair of side frames 15 are provided on both sides of the motor compartment 3 in the leftward and rightward direction (vehicle width direction). Each of the side frames 15 extends in the forward and rearward direction. Each of the side frames 15 is bent upward from a front lower portion of the passenger compartment 6 and then further extends forward. Rear ends of both the side frames 15 are coupled to a frame member (for example, a floor frame (not shown), a side sill (not shown), or the like) provided at a center of the vehicle body 2 in the forward and rearward direction. A front bulkhead 17 (refer to FIG. 1) is connected to front ends of both the side frames 15.

A wheel house 21 (refer to FIG. 1) is provided on each of the side frames 15. As shown in FIG. 1, each wheel house 21 extends outward in the leftward and rightward direction as it goes upward. An upper member 22 is provided on an upper end edge of the wheel house 21. The upper member 22 extends in the forward and rearward direction. A front end of the upper member 22 is coupled to an upper portion of the front bulkhead 17 described above.

As described above, in the embodiment, both the side frames 15 described above form a lower frame of the motor compartment 3. Both the upper members 22 form an upper frame of the motor compartment 3. The front bulkhead 17 forms a front frame of the motor compartment 3.

As shown in FIG. 2, an upper end opening portion of the motor compartment 3 is covered from an upper side thereof by a hood 31. The hood 31 is formed in a curved shape which is convex toward an upper side and extends gradually upward toward a rear side thereof. A rear end of the hood 31 is rotatably supported by the vehicle body 2. Therefore, the motor compartment 3 is formed to be opened and closed.

A driving motor 33, a fuel cell stack 34, and so on are accommodated in the motor compartment 3.

The driving motor 33 is formed in a cylindrical shape. The driving motor 33 is disposed in a state in which a rotating shaft thereof is directed in the leftward and rightward direction of the vehicle 1. The driving motor 33 is supported by a sub-frame (not shown) via a vibration-proof member or the like. The sub-frame is a frame-shaped member disposed below the side frame 15. The sub-frame is connected to the above-described side frame 15 or the like.

<Fuel Cell Stack>

As shown in FIG. 1, the fuel cell stack 34 is disposed above the driving motor 33 in the motor compartment 3. The fuel cell stack 34 is supported by the vehicle body 2 (for example, the side frame 15 or the like) or the driving motor 33 via the vibration-proof member (not shown) or the like. The fuel cell stack 34 is formed in a rectangular parallelepiped shape of which a longitudinal direction thereof is the leftward and rightward direction of the vehicle 1. The fuel cell stack 34 mainly includes a stacked cell body 37 and a casing 38 which accommodates the stacked cell body 37. The stacked cell body 37 has a constitution in which a plurality of unit cells 36 are stacked in the leftward and rightward direction of the vehicle 1.

<Unit cell>

Figure 3:
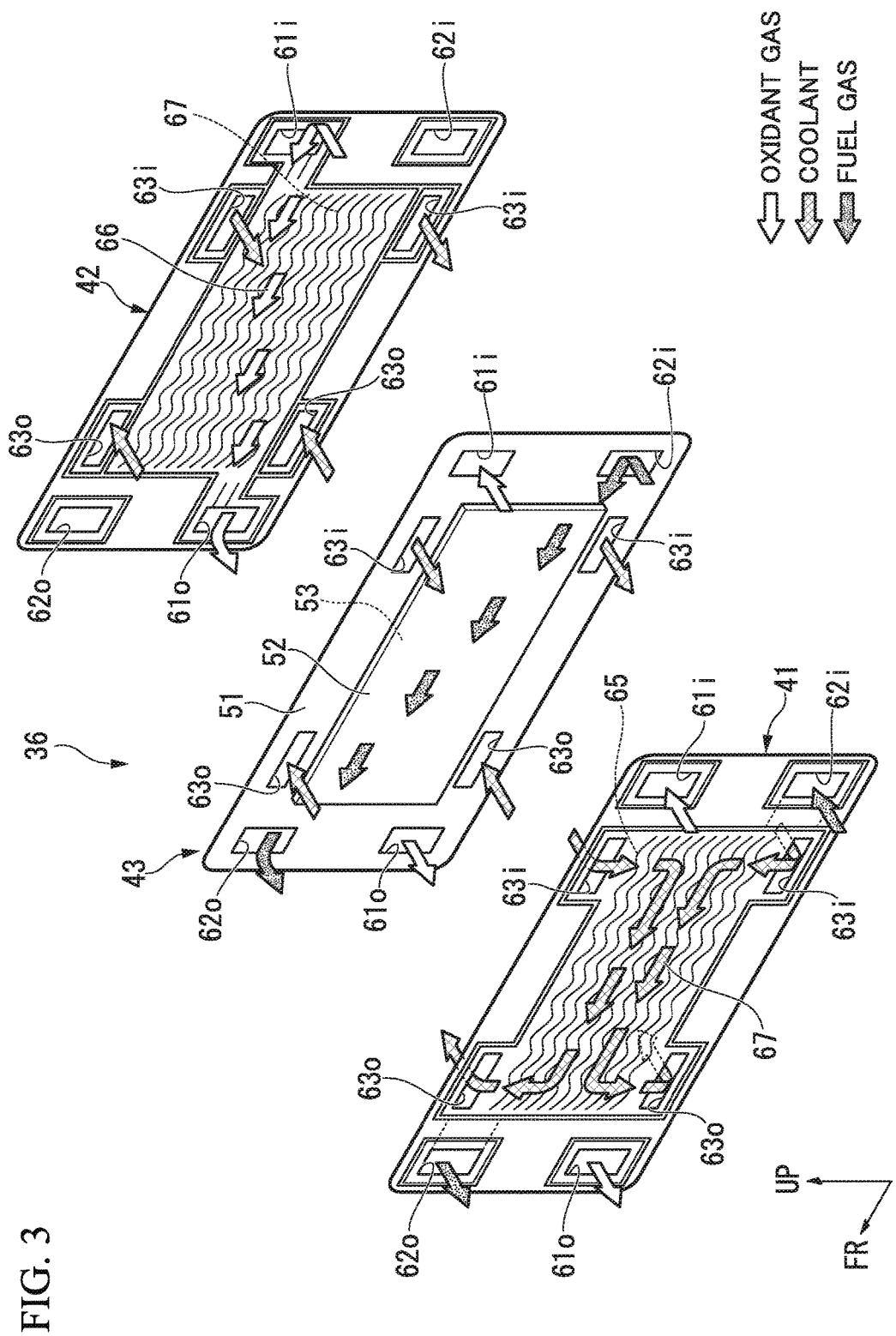
FIG. 3 is an exploded perspective view of a unit cell.

FIG. 3 is an exploded perspective view of the unit cell 36.

As shown in FIG. 3, the unit cell 36, for example, includes a pair of separators 41 and 42, and a membrane-electrode assembly 43 (hereinafter, simply referred to as MEA 43) sandwiched between the respective separators 41 and 42. The MEA 43 includes a solid polymer electrolyte membrane 51, and an anode electrode 52 and a cathode electrode 53 which sandwich the solid polymer electrolyte membrane 51 from both sides in the leftward and rightward direction of the vehicle 1 (thickness direction of the solid polymer electrolyte membrane 51).

The anode electrode 52 and the cathode electrode 53 have a gas diffusion layer formed of carbon paper or the like, and an electrode catalyst layer which is formed by uniformly applying porous carbon particles with a platinum alloy held on a surface thereof to a surface of the gas diffusion layer.

The solid polymer electrolyte membrane 51, for example, is formed of a material in which perfluorosulfonic acid polymer is impregnated with water. The solid polymer electrolyte membrane 51 has an external shape in a front view as seen in the leftward and rightward direction of the vehicle 1 which is larger than the anode electrode 52 and cathode electrode 53. In the example of FIG. 3, the anode electrode 52 and the cathode electrode 53 overlap each other in a central portion of the solid polymer electrolyte membrane 51. An outer circumferential portion of the solid polymer electrolyte membrane 51 protrudes from the anode electrode 52 and the cathode electrode 53 in a frame shape.

Respectively, the separators 41 and 42 of the unit cell 36 are a first separator 41 which faces the anode electrode 52 of the MEA 43, and a second separator 42 which faces the cathode electrode 53 of the MEA 43.

In each corner portion of the unit cell 36, inlet gas communication holes (an oxidant gas inlet communication hole 61i and a fuel gas inlet communication hole 62i), and outlet gas communication holes (an oxidant gas outlet communication hole 61o and a fuel gas outlet communication hole 62o) are formed. Each of the communication holes 61i, 61o, 62i and 62o passes through the unit cell 36 in the leftward and right direction of the vehicle 1. In an example shown in FIG. 3, the oxidant gas inlet communication hole 61i which supplies an oxidant gas (e.g., air or the like) is formed in a rear upper corner portion of the unit cell 36 (on a side opposite to the arrow FR). The fuel gas inlet communication hole 62i which supplies a fuel gas (for example, hydrogen, or the like) is formed in a rear lower corner portion of the unit cell 36. The oxidant gas outlet communication hole 61o which discharges the spent oxygen gas is formed in a front lower corner portion of the unit cell 36. The fuel gas outlet communication hole 62o which discharges the spent fuel gas is formed in a front upper corner portion of the unit cell 36.

In the unit cell 36, a coolant inlet communication hole 63i is formed at a portion located in front of each of the inlet communication holes 61i and 62i (on the arrow FR side).

In the unit cell 36, a coolant outlet communication hole 63o is formed at a portion located behind each of the outlet communication holes 61o and 62o. A pair of coolant inlet communication holes 63i are disposed at positions which vertically face each other while the anode electrode 52 and the cathode electrode 53 are interposed therebetween. A pair of coolant outlet communication holes 63o are disposed at positions which vertically face each other while the anode electrode 52 and the cathode electrode 53 are interposed therebetween.

A central portion of each of the separators 41 and 42 is formed to have a concavo-convex shape by press forming or the like. Gas flow passages 65 and 66 are formed between one of surfaces of the separators 41 and 42 which faces the MEA 43 in the leftward and rightward direction of the vehicle 1, and the MEA 43.

Specifically, a fuel gas flow passage 65 is formed between a surface of the first separator 41 facing the anode electrode 52 and the anode electrode 52 of the MEA 43. The fuel gas flow passage 65 communicates with each of the fuel gas inlet communication hole 62i and the fuel gas outlet communication hole 62o.

An oxidant gas flow passage 66 is formed between a surface of the second separator 42 facing the cathode electrode 53 and the cathode electrode 53 of the MEA 43. The oxidant gas flow passage 66 communicates with each of the oxidant gas inlet communication hole 61i and the oxidant gas outlet communication hole 61o.

The stacked cell body 37 is configured so that the first separator 41 of one unit cell 36 and the second separator 42 of another unit cell 36 adjacent to the one unit cell 36 are stacked in the leftward and rightward direction of the vehicle 1 in an overlapping state. A coolant flow passage 67 is formed between the first separator 41 of the one unit cell 36 and the second separator 42 of the other unit cell 36. The coolant flow passage 67 communicates with each of the coolant inlet communication holes 63i and the coolant outlet communication holes 63o. As a coolant flowing through the coolant flow passage 67, for example, pure water, ethylene glycol or the like is preferably used.

A stacked structure of the unit cells 36 is not limited to the above-described constitution. For example, the unit cell may be constituted with three separators and two MEAs interposed between the respective separators. It is also possible to appropriately change a design of a layout of the respective communication holes.

As shown in FIG. 1, the casing 38 is formed in a box shape having a size larger than the stacked cell body 37. Specifically, the casing 38 has a first end plate 71, a second end plate 72 and a side panel 73. The first end plate 71 and the second end plate 72 sandwich the stacked cell body 37 from both sides in the leftward and rightward direction of the vehicle 1. The side panel 73 surrounds the periphery of the stacked cell body 37.

Gas inlet holes (an oxidant gas inlet hole 83i and a fuel gas inlet hole 84i) and gas outlet holes (an oxidant gas outlet hole 83o and a fuel gas outlet hole 84o) passing through the first end plate 71 in a direction A are formed in the first end plate 71. The oxidant gas inlet hole 83i communicates with the above-described oxidant gas inlet communication hole 61i. The oxidant gas outlet hole 83o communicates with the above-described oxidant gas outlet communication hole 61o. The fuel gas inlet hole 84i communicates with the above-described fuel gas inlet communication hole 62i. The fuel gas outlet hole 84o communicates with the above-described fuel gas outlet communication hole 62o.

A coolant inlet hole (not shown) and a coolant outlet hole (not shown) are formed in the second end plate 72. The coolant inlet hole and the coolant outlet hole pass through the second end plate 72 in the leftward and rightward direction of the vehicle 1. The coolant inlet hole communicates with the above-described coolant inlet communication hole 63i. The coolant outlet hole communicates with the above-described coolant outlet communication hole 63o.

The side panel 73 is formed by assembling four panels (a front panel 91, an upper panel 92, a rear panel 93 and a lower panel 94). Each of the panels 91 to 94 is provided to correspond to each side of each of the end plates 71 and 72. Each of the panels 91 to 94 is fastened to each of the end plates 71 and 72 while sandwiched between the end plates 71 and 72 in the leftward and rightward direction of the vehicle 1.

A plurality of casing communication ports (not shown) are formed in the upper panel 92. The casing communication ports pass through the casing 38 to communicate an inside and an outside of the casing 38. The casing communication port serves to discharge a reaction gas leaking from the stacked cell body 37 to the outside of the casing 38. The number, a shape, a layout, and so on of the casing communication ports may be appropriately designed and changed.

Here, an exhaust duct 100 is disposed on the upper panel 92. The exhaust duct 100 serves to discharge the reaction gas discharged from the casing communication port to the outside of the vehicle 1. The exhaust duct 100 has a manifold 101 which is connected to the upper panel 92 and a connecting portion 102 which allows an inside of the manifold 101 and the outside of the vehicle 1 to communicate with each other.

The manifold 101 is formed in a square cylindrical shape of which a diameter gradually decreases as it goes upward. Specifically, a lower end edge of the manifold 101 is formed in a frame shape which extends along an outer perimeter edge of the upper panel 92. The lower end edge of the manifold 101 is connected to an outer perimeter edge of each side of the upper panel 92. That is, the manifold 101 is formed by connecting side edges of wall portions 110 to 113 provided corresponding to the respective sides of the upper panel 92 with each other. Additionally, the manifold 101 collectively surrounds the plurality of casing communication ports.

An upper end edge of the manifold 101 is formed in a frame shape having an external shape in a plan view which is smaller than the lower end edge of the manifold 101. A center of an upper end opening portion of the manifold 101 is displaced rearward from a center of a lower end opening portion of the manifold 101. However, the centers of both the end opening portions of the manifold 101 may coincide with each other.

The wall portions 110 to 113 forming the manifold 101 extend from the lower end edge of the manifold 101 to the upper end edge thereof in an inclined state. Particularly, as shown in FIG. 2, in the wall portions 110 to 113 forming the manifold 101, the front wall portion 110 connected to a front end edge of the upper panel 92 extends along a shape of a lower surface of the hood 31. That is, the front wall portion 110 extends upward as it goes rearward. At least a part of the front wall portion 110 is preferably parallel to the lower surface of the hood 31. However, the front wall portion 110 may be inclined with respect to the lower surface of the hood 31 as long as it extends along the lower surface of the hood 31 as a whole.

The connecting portion 102 communicates the inside of the manifold 101 with the outside of the vehicle 1. The connecting portion 102 extends in the leftward and rightward direction of the vehicle 1. An upstream end of the connecting portion 102 is connected to the upper end opening portion (the uppermost portion of the manifold 101) of the manifold 101. A downstream end of the connecting portion 102 is connected to, for example, an exhaust port 115 formed in the cowl member 11 (dashboard upper 5*b*). The exhaust port 115 vertically passes through a right side end portion (second side) of the dashboard upper 5*b* in the leftward and rightward direction. That is, the exhaust port 115 and the above-described external air intake port 14 are disposed on both sides of the cowl member 11 with respect to a center thereof in the leftward and rightward direction of the vehicle 1. The manifold 101 communicates with the outside of the vehicle 1 through the exhaust port 115 and a communication hole (not shown) formed in the cowl top 12. The exhaust port 115 may communicate with the outside of the vehicle 1 through a communication hole formed in a front fender or the like.

In the vehicle 1 of the embodiment, in the fuel cell stack 34, hydrogen is supplied as the fuel gas to the fuel gas flow passage 65, and air containing oxygen is supplied as the oxidant gas to the oxidant gas flow passage 66. Then, hydrogen ions generated by a catalytic reaction at the anode electrode 52 pass through the solid polymer electrolyte membrane 51 and move to the cathode electrode 53, and an electrochemical reaction with oxygen occurs at the cathode electrode 53. Accordingly, electric power is generated in the fuel cell stack 34, and the driving motor 33 is driven by the electric power generated in the fuel cell stack 34.

Here, the reaction gas leaking from the stacked cell body 37 flows into the exhaust duct 100 through the casing communication port. The reaction gas flowing into the exhaust duct 100 flows upward in the manifold 101 and then flows into the connecting portion 102 through the upper end opening portion of the manifold 101. The reaction gas flowing into the connecting portion 102 flows through the connecting portion 102 and is then discharged to the outside of the vehicle 1 through the exhaust port 115.

In the vehicle 1 of the embodiment, external air is introduced into the air conditioner 13 through the external air intake port 14. The external air introduced into the air conditioner 13 exchanges heat in the air conditioner 13 and is then supplied into the passenger compartment 6.

Here, in the embodiment, the exhaust port 115 and the external air intake port 14 are disposed at positions separated toward both sides of the cowl member 11 with respect to the center thereof in the leftward and rightward direction of the vehicle 1.

According to such a constitution, since the exhaust port 115 and the external air intake port 14 can be separated from each other in the leftward and rightward direction of the vehicle 1, the reaction gas discharged through the exhaust port 115 can be prevented from flowing into the external air intake port 14. Therefore, the reaction gas leaking from the fuel cell stack 34 can be prevented from being supplied into the passenger compartment 6 together with the external air through the air conditioner 13.

Further, in the embodiment, the manifold 101 (front wall portion 110) of the exhaust duct 100 extends along the lower surface of the hood 31.

According to such a constitution, the reaction gas (in particular, the fuel gas) flowing into the manifold 101 is guided upward as it goes rearward. The reaction gas guided upward in the manifold 101 flows into the connecting portion 102 connected to the uppermost portion of the manifold 101 and is then discharged to the outside of the vehicle 1. Therefore, the reaction gas flowing through the exhaust duct 100 can be efficiently discharged to the outside of the vehicle 1.

Further, the technical scope of the present invention is not limited to each of the embodiments described above and includes various modifications to the above-described embodiments without departing from the spirit of the present invention.

For example, in the above-described embodiment, the constitution in which the exhaust port 115 and the external air intake port 14 are formed at both ends of the cowl member 11 in the leftward and rightward direction of the vehicle 1 has been described, but the present invention is not limited to this constitution. For example, the exhaust port 115 and the external air intake port 14 may be formed on both sides of the cowl member 11 with respect to the center thereof in the leftward and rightward direction of the vehicle 1.

In the above-described embodiment, all the case in which the exhaust port 115 and the external air intake port 14 are formed in the cowl member 11 has been described, but the present invention is not limited to this constitution. For example, the exhaust port 115 is not limited to the cowl member 11 and may be formed in a front fender or the like. The external air intake port 14 is not limited to the cowl member 11 and may be formed in the dashboard lower 5*a* or the like.

In the above-described embodiment, the constitution in which the casing communication port is formed in the upper panel 92 has been described, and the present invention is not limited to this constitution, and the casing communication port may be formed at an arbitrary position on the casing 38.

In the above-described embodiment, the constitution in which the exhaust duct 100 is collectively connected to each of the casing communication ports of the fuel cell stack 34 has been described, and the present invention is not limited to this constitution. That is, a plurality of exhaust ducts may be separately connected to the plurality of casing communication ports.

Further, a plurality of connecting portions 102 may be connected to the manifold 101.

In the above-described embodiment, the constitution in which the manifold 101 of the exhaust duct 100 extends along the lower surface of the hood 31 has been described, but the present invention is not limited to this constitution. An extension direction of the exhaust duct 100 can be appropriately changed according to a layout inside the motor compartment 3 or the like.

Although preferred embodiments of the present invention have been described above, the present invention is not limited to these embodiments. Additions, omissions, substitutions, and other changes in the constitution are possible without departing from the spirit of the present invention. The present invention is not limited by the foregoing description and only by the scope of the appended claims.

What is claimed is:

1. A fuel cell-equipped vehicle comprising:
a fuel cell stack disposed in a front space of a vehicle body separated by a partition member and configured to accommodate a stacked cell body, in which a plurality of fuel cells are stacked, in a casing; and
an air conditioner disposed in a rear space of the vehicle body separated by the partition member,
wherein external air is introduced from an internal room of the vehicle body into the air conditioner through an external air intake port formed at a portion of the partition member located on a first side with respect to a center in a vehicle width direction of the vehicle body,
an upstream end of an exhaust duct configured to discharge a reaction gas in the casing is connected to a communication port formed in the casing to allow communication between an inside and outside of the fuel cell stack,
a downstream end of the exhaust duct communicates with an outside of the vehicle body at a portion located on a second side with respect to the center in the vehicle width direction, and
a wall of the partition member on which the external air intake port is formed is disposed inside the vehicle body.

2. The fuel cell-equipped vehicle according to claim 1, comprising a hood configured to close the front space from an upper side thereof and to extend upward as it goes rearward,
wherein the exhaust duct has a manifold configured to extend upward as it goes rearward along the hood, and a connecting portion connected to an uppermost portion of the manifold and configured to extend to the second side in the vehicle width direction.

3. The fuel cell-equipped vehicle according to claim 1, wherein the external air intake port is disposed below a front glass.

4. The fuel cell-equipped vehicle according to claim 1, wherein the wall on which the air intake port is formed is a part of a surrounding unit that surrounds the internal room extending in at least the vehicle width direction, and
the downstream end of the exhaust duct is connected to the surrounding unit.

5. The fuel cell-equipped vehicle according to claim 1, wherein the internal room has an extending length in the vehicle width direction that is greater than a length of the casing in the width direction.

6. A fuel cell-equipped vehicle comprising:
a fuel cell stack having a stacked cell body and a casing, the stacked cell body including a stacked plurality of fuel cells, the casing being configured to accommodate the stacked cell body;
an air conditioner disposed in a rear space of the vehicle body with respect to the fuel cell stack;
a partition member disposed between the fuel cell stack and the rear space;
a first duct that is connected to the casing and via which a reaction gas from the fuel cell stack discharges; and
a second duct to which the first duct is connected, the second duct being provided surrounding an internal room that extends in at least a vehicle width direction of the vehicle body, wherein the second duct has:
a first port provided, as an air intake port for the air conditioner, at a first side of the vehicle body with respect to a center in the vehicle width direction, and
a second port, via which the first duct is fluidically connected to the second duct, provided at a second side of the vehicle body with respect to the center in the vehicle width direction.

7. The fuel cell-equipped vehicle according to claim 6, wherein the first opening is provided on a wall disposed inside the vehicle body, the first opening being disposed between the casing and an outermost side wall of the vehicle body in the vehicle width direction.

8. The fuel cell-equipped vehicle according to claim 6, wherein the internal room has an extending length in the vehicle width direction that is greater than a length of the casing in the width direction.

9. The fuel cell-equipped vehicle according to claim 6, wherein the second duct is disposed above the casing.

10. A fuel cell-equipped vehicle comprising:
a fuel cell stack disposed in a front space of a vehicle body separated by a partition member and configured to accommodate a stacked cell body, in which a plurality of fuel cells are stacked, in a casing; and
an air conditioner disposed in a rear space of the vehicle body separated by the partition member,
wherein external air is introduced into the air conditioner through an external air intake port formed at a portion of the partition member located on a first side with respect to a center in a vehicle width direction of the vehicle body,
an upstream end of an exhaust duct configured to discharge a reaction gas in the casing is connected to a communication port formed in the casing to allow communication between an inside and outside of the fuel cell stack,
a downstream end of the exhaust duct communicates with an outside of the vehicle body at a portion located on a second side with respect to the center in the vehicle width direction,
the fuel cell-equipped vehicle further comprises a hood configured to close the front space from an upper side thereof and to extend upward as it goes rearward, and
the exhaust duct has a manifold configured to extend upward as it goes rearward along the hood, and a connecting portion connected to an uppermost portion of the manifold and configured to extend to the second side in the vehicle width direction.

* * * * *